S. D. ARNOLD.
Bolts for Doors.

No. 138,360. Patented April 29, 1873.

Witnesses,
Chas. H. Smith
Geo. D. Walker

Inventor,
Stephen D. Arnold
Lemuel W. Serrell
atty.

UNITED STATES PATENT OFFICE.

STEPHEN D. ARNOLD, OF NEW BRITAIN, CONNECTICUT, ASSIGNOR TO P. CORBIN AND F. CORBIN, OF SAME PLACE.

IMPROVEMENT IN BOLTS FOR DOORS.

Specification forming part of Letters Patent No. 138,360, dated April 29, 1873; application filed April 12, 1873.

*To all whom it may concern:*

Be it known that I, STEPHEN D. ARNOLD, of New Britain, in the county of Hartford and State of Connecticut, have invented an Improvement in Bolts for Doors, of which the following is a specification:

The object of this invention is to secure the bolt when projected, and avoid the friction that is usually applied to a bolt to prevent the same falling or being shaken or moved by efforts to open the door from outside.

I make use of a spring-dog hinged to the bolt-stock, and operated by a pin passing through the knob, so that the bolt is held by the dog when projected, and the dog is self-acting in holding the bolt projected, but slides when the bolt is being moved.

Figure 2:
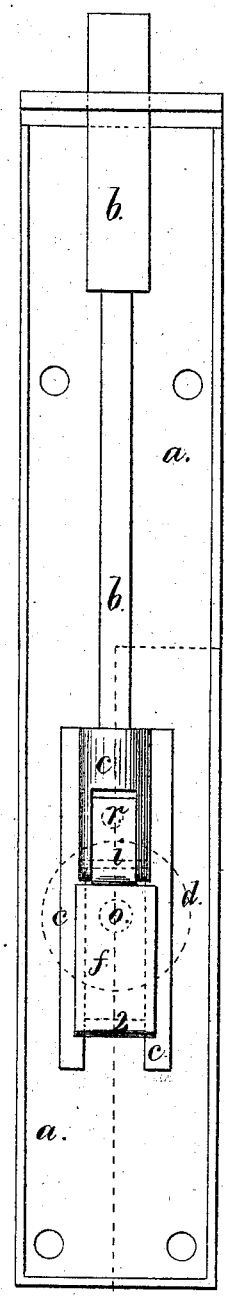
Figure 1:
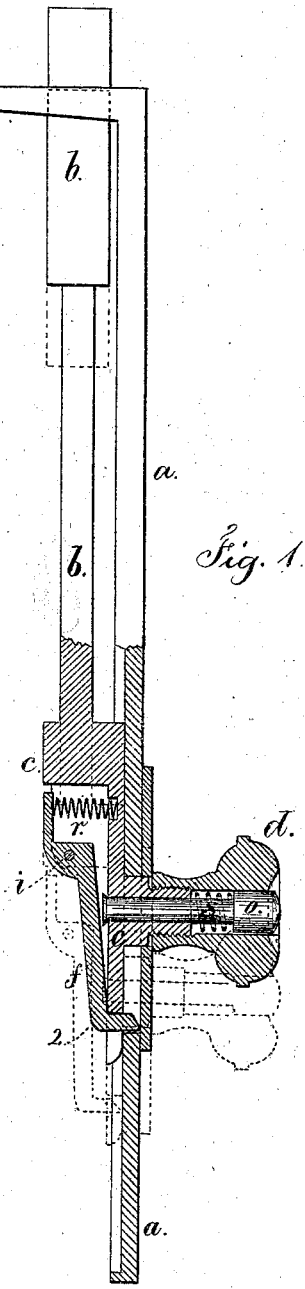

In the drawing, Figure 1 is a vertical section with the bolt projected, and the positions of the parts when the bolt is retracted are shown by dotted lines; and Fig. 2 is a rear elevation.

The plate $a$ of the bolt is of usual size and character, and $b$ is the bolt united to the bolt-stock $c$ that slides in a mortise in said plate $a$. $d$ is the knob to operate said bolt, and $f$ is a dog united by the hinge $i$ to the stock $c$, and $o$ is a push-pin by which the lower end 2 of the dog can be pushed out of the mortise in the plate $a$, but when the bolt is projected said dog is made to hold the same by the spring $r$ throwing the end 2 of said dog into the mortise.

The push-pin $o$ passes through the stock $c$ and knob $d$, and there is a spring, $s$, between the stock $c$ and the enlarged end of the pin $o$ to keep said pin clear of the dog $f$.

When this improvement is used upon a bolt for the bottom of the door there may be a spring around the bolt $b$ to throw the same up when the dog $f$ is pushed back.

I claim as my invention—

The dog $f$, hinged to the stock $c$ of the bolt, in combination with the spring $r$ and the push-pin $o$ that passes through the knob $d$, as and for the purposes set forth.

Signed by me this 4th day of April, A. D. 1873.

S. D. ARNOLD

Witnesses:
  CHARLES PECK,
  JOHN R. SLOANE.